INVENTOR
JACQUES I. PANKOVE

BY George J. Seligsohn
ATTORNEY

United States Patent Office 3,537,028
Patented Oct. 27, 1970

1

3,537,028
CONFOCAL SEMICONDUCTOR DIODE INJECTION LASER
Jacques I. Pankove, Princeton, N.J., assignor to RCA Corporation, a corporation of Delaware
Filed Oct. 23, 1967, Ser. No. 677,302
Int. Cl. H01s 3/05
U.S. Cl. 331—94.5                                    8 Claims

ABSTRACT OF THE DISCLOSURE

There is disclosed a confocal semiconductor diode laser, In particular, this laser comprises N-type semiconductor in the shape of a slice of a sphere having the center of the sphere located within the slice. A P-type semiconductor region in the vicinity of the sphere center forms a P-N junction substantially at the center. A total reflector in cooperative relationship with a first portion of the spherical surface of the slice and a second portion of the spherical surface of the slice diametrically opposite to the first portion which forms a partial reflector provide a confocal optical resonant cavity for the P-N junction at the center. The confocal semiconductor diode can be operated continuously at room temeprature because it requires a much smaller lasing threshold current than other injection lasers, resulting in much less heat dissipation.

---

This invention relates to a semiconductor diode injection laser and, more particularly, to a confocal diode semiconductor laser.

An injection laser diode, as known in the part, consists of a P-N junction diode composed of a semiconductor forming an optical resonant cavity and capable of producing light by stimulated emission when the current density across the P-N junction exceeds a critical value. Examples of a semiconductor material which is useful in an injection laser diode are GaAs, alloys of $GaAs_{1-x}P_x$, or $Ga_{1-x}In_xAs$, for instance.

The term "light," as used herein, includes not only visible light, but infrared and ultraviolet light as well. Injection laser diodes, as usually fabricated, consist of a layer of N-type conductivity semiconductor material in intimate contact with a layer of P-type conductivity semiconductor material forming a P-N junction therebetween. The typical P–N junction area is in the order of $10^{-3}$–$10^{-4}$ cm.$^2$ The optical resonant cavity for such diode is formed by cleaving opposite sides of the semiconductor to form parallel surfaces. Either one or both of these cleaved parallel surfaces may have a mirror coating thereon or they may be uncoated. In the latter case, the required reflectivity at a parallel cleaved surface is obtained due to the difference in the index of refraction of the semiconductor and the index of refraction of the surrounding ambient.

Some of the advantages of injection lasers, as compared to other types of lasers, are that they may be made very small and inexpensive and, they may be easily pumped by passing a forward current through the diode at low voltage which makes them suitable for compact systems, However, a significant disadvantage of present-day injection lasers, as compared with other types of lasers, is that the internal power dissipation prevents their continuous operation at room temperature, where they can be operated only with very short pulses of the order of 100 nanoseconds even if overheating is to be prevented.

Although an injection laser will operate at a lower threshold current density at cryogenic temperatures, a room temperature laser requires a threshold current density of the order of $10^5$ amperes/cm.$^2$ when no reflecting coating is used on the cleaved parallel sides of the diode forming the optical resonant cavity of the laser. Although this threshold current density can be reduced by utilizing such reflecting coatings, still a minimum power of many watts must be dissipated within the very small volume of the conventional semiconductor diode laser. Obviously, such powers can be tolerated only in short pulses at low duty cycles. If P-N junction areas of the order of $10^{-6}$ cm.$^2$, rather than the normally utilized junction area of $10^{-3}$–$10^{-4}$ cm.$^2$, could be used, low thresholds of 0.1 amperes, rather that many amperes, could be obtained, resulting in a much lower internal generation of heat. However, in the past, junction areas in the order of $10^{-6}$ cm.$^2$ were not practical.

In accordance with the principles of the present invention, a laser diode having a P-N junction area in the order of $10^{-6}$ cm.$^2$ is made mechanically practical, thermally efficient and optically convenient. More specifically, in accordance with the present invention, the optical resonant cavity of the injection laser comprises a curved reflecting surface shaped to have a predetermined focus and the P-N junction area is confined substantially to the region of this focus. Thus, the P-N junction itself along with the curved reflecting surface comprises the optical resonant cavity of the semiconductor diode injection laser of the present invention. This permits lower lasing threshold currents and lower power dissipation within the diode. Further, the junction is surrounded by transparent semiconductor which acts as a heat sink for dissipating the relatively small amount of heat generated within the diode.

It is therefore an object of the present invention to provide an improved injection laser which may be operated continuously at room temperature.

It is a more specific object of the present invention to provide a confocal diode semiconductor laser.

These and other objects, features and advantages of the present invention will become more apparent from the following detailed description taken together with the accompanying drawings, in which:

FIG. 3 illustrates a second preferred embodiment of the injection laser of the present invention.

Figure 1:
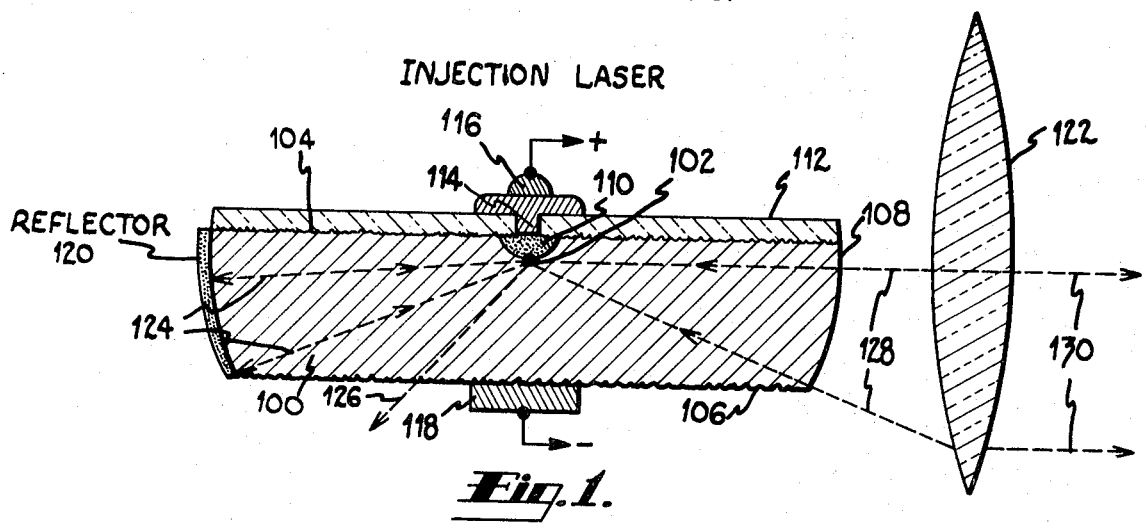
FIG. 1 illustrates a first preferred embodiment of the injection laser of the present invention.

Referring now to FIG. 1, there is shown in cross section a chip 100 of N-type semiconductor material, such as GaAs, useful in an injection laser diode. As shown, the geometry of chip 100 is in the form of a slice of a sphere, which sphere has its center at point 102. This slice is defined by substantially parallel upper and lower surfaces 104 and 106, respectively, and spherical surface 108, centered at point 102, forming the side of chip slice 100, which intersects upper and lower surfaces 104 and 106 as shown.

A P-N junction is formed at center point 102 by a small region 110 of P-type semiconductor material connecting center point 102 to upper surface 104. Upper surface 104 is covered with a thin insulator layer forming mask 112 having a very small opening 114 therein in cooperative relationship with region 110.

Electrode 116 is situated as shown on the mask 112 over opening 114 to provide contact with P-type semiconductor region 110 through opening 114, while remaining insulated from N-type semiconductor chip slice 100, as shown. Electrode 118 is provided in contact with bottom surface 106. In direct contact with a portion of spherical surface 108 is reflector 120. As shown reflector 120 is in the form of a stripe of substantially totally reflective material which is directly on a portion of spherical surface 108 in which the length of the stripe lies in a plane normal to first and second parallel surfaces 104 and 106. The width of the stripe forming reflector 120, which extends in the circumferential direction of chip slice 100 (that is in a direction into the paper), is quite narrow, being in the order of one degree or so.

The injection laser of the present invention further includes lens 122, for purposes to be discussed below, which is oriented in spaced relationship with a second portion of spherical surface 108 of chip slice 100, this second portion of spherical surface 108 being 180 degrees displaced with respect to the first-mentioned portion of spherical surface 108 of chip slice 100 with which reflector 120 is in contact.

Further, upper and lower parallel surfaces 104 and 106 are roughened, as indicated by the uneven lines with which they are shown in the drawing.

Typical dimensions of the injection laser shown in FIG. 1 are as follows: a spherical radius of one mm. and a thickness (distance between upper and lower parallel surfaces 104 and 106) of 0.5 mm.

The desired spherical surface of the semiconductor material can be easily obtained by cutting, grinding, and polishing a workpiece within a machine tool for generating spherical surfaces. More particularly, in such a machine, the tool is moved in arcs about a predetermined center and the workpiece is held in a jig which is situated so that this predetermined center is in coincidence with the desired center 102 of spherical surface 108.

Figure 2:
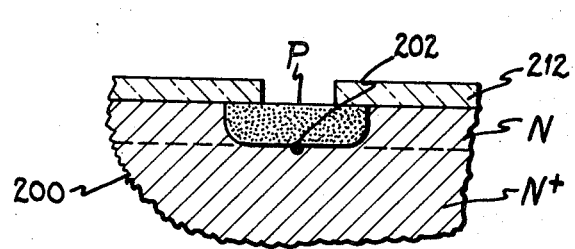
FIG. 2 is a fragmentary view showing a preferred embodiment of the P-N junction which may be utilized in the injection laser of the present invention.
Figure 7:
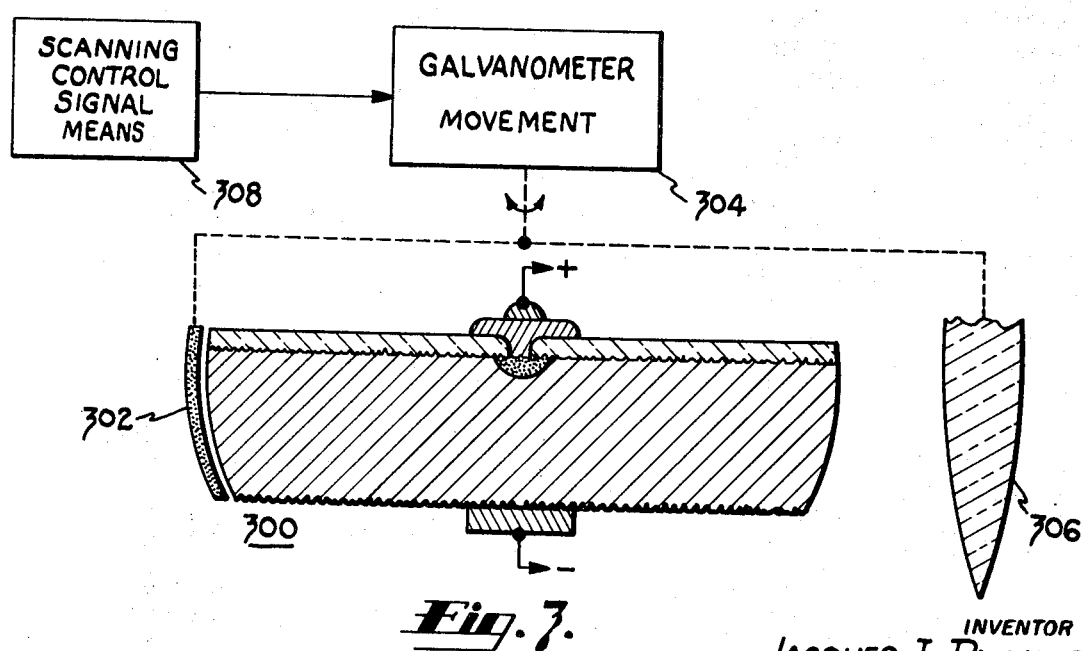

FIG. 2 shows a preferred type of P-N junction for use in the present invention. More particularly, slice 200 of N-type semiconductor, which corresponds to chip slice 100 of FIG. 1, consists in FIG. 2 of a substrate, designated N+, which is composed of highly doped relatively low resistivity N-type semiconductor material. This N+ substrate portion of chip slice 200 is covered with a thin layer, designated N, of substantially uniform thickness of lightly doped relatively high resistance N-type material.

The region of P-type material, designated P in FIG. 2, is obtained by diffusing a P-type doping material, such as zinc, through a small hole in a suitable mask into the lightly doped N layer. By limiting the concentration of P doping, the resulting P-type region will be confined to a portion of the lightly doped N layer and will not extend into the heavily doped N+ substrate. This means that the active P-N junction will be defined by N–N+ interface which can be made very flat. The center of the spherical surface 202, which corresponds with center 102 in FIG. 1, is located at the P-N junction confined by the N–N+ interface. Mask 212 corresponds with mask 112 in FIG. 1. In FIG. 2, the typical active P-N junction diameter is approxiamtely 12 microns and the typical junction depth (thickness of the N-type high resistivity layer) is approximately ten microns.

Considering now the operation of the injection laser shown in FIGS. 1 and 2, if electrode 116 is connected to a point of suitable positive potential and electrode 118 is connected to a point of suitable negative potential, and injection current will flow therebetween through the P-N junction. If the current density is sufficiently high, photons will be generated at the P-N junction and will propagate in all directions from the center. Those photons which impinge upon refletcor 120 (rays 124) will be reflected back to the P-N junction at the center of the spherical slice where they will stimulate the generation of like photons, thus inducing the required coherence. Some of the radiation propagating toward the opposite surface 108 (rays 128) will also be reflected back to the P-N junction and will participate in the stimulation process. Thus the total reflector 120 and the partial reflector 108 form a resonant optical cavity for radiation passing through the center 102. This is a true confocal cavity. The radiation which is partly trapped in this cavity is coherent.

Some of the light emitted by the P-N junction at the center will be directed toward either upper or lower parallel surfaces 104 or 106, as indicated by ray 126. This light will be transmitted, scatered or absorbed by the roughness of the surface and thereby prevent lasing to take place in unwanted modes. Due to the fact that the P-N junction has a flat interface surface, as shown in FIG. 2, it is the radiation propagating along the diameter which will see most gain and will determine the lasing mode. The small thickness of the active region in the P-N junction (typically one micron) causes a divergence of several degrees in a plane transverse tothe P-N junction. It is to give this diverging beam (rays 124, 128) equal path length that a confocal cavity is needed. Lens 122 converts those diverging rays 128, which are transmitted by surface 108 and which constitute the output from the injection laser, into parallel rays 130.

Referring now to FIG. 3, laser 300 is identical to the laser shown in FIG. 1 except that the reflector 302 in FIG. 3 is in spaced relationship, rather than in being in direct contact, with respect to the rest of the laser. The arrangement shown in FIG. 3 is less efficient than the arrangement in FIG. 1, since the air to semiconductor interface between reflector 302 and the rest of laser 300 is itself a partial reflector and causes unwanted scattering of light. This loss in efficiency can be lowered somewhat by the use of an anti-reflecting coating on the portion of the spherical surface of laser 300 in cooperative relationship with reflector 302. However, in any event, the loss in efficiency in the laser of FIG. 3, as compared with the laser of FIG. 1, is offset by its greater versatility.

More particularly, reflector 302 along with lens 306 is coupled to galvanometer movement 304, as shown. Galvanometer movement 304, in turn, is controlled by a signal applied thereto from scanning control signal means 308.

It will be seen that the direction of the laser light output beam emitted by the laser may be angularly displaced in accordance with the signal applied from scanning control signal means 308. In fact, this angular displacement may be as high as 360 degrees, if desired. The arrangement shown in FIG. 3 is of particular value in providing a scanning laser light beam.

What is claimed is:

1. In an injection laser apparatus adapted to operate in an optical ambient comprising a junction between N-type and P-type semiconductors having an index of refraction significantly higher than said ambient; the improvement wherein one of said types is substantially in the form of a slice of a sphere which sphere is of a given radius, said slice including the center of said sphere, wherein said other of said types is in the form of a region having dimensions each of which is much smaller than said given radius, said region being oriented with respect to said slice to produce a P-N junction therebetween substantially at said center of said sphere, whereby any light emanating from said P-N junction which impinges upon the spherical surface interface of said slice with said ambient is partially reflected back to said P-N junction, and wherein reflector means having a highly reflective surface relative to that of said interface is oriented in cooperative relationship with a portion of the spherical surface of said slice to reflect any light emanating from said P-N junction at said center which impinges on said reflector means back to said center.

2. The injection laser apparatus defined in claim 1, wherein the thickness of said slice is defined by first and second substantially parallel surfaces, wherein a portion of said region is exposed at solely said first surface, a first electrode in contact with the exposed portion of said region and a second electrode in contact with said second surface.

3. The injection laser apparatus defined in claim 2, wherein said first and second surfaces are roughened for scattering any light impinging thereon.

4. The injection laser apparatus defined in claim 2, where said first surface is covered with an insulator layer masking all of said first surface except a given area of said exposed portion of said region.

5. The injection laser apparatus defined in claim 2, wherein said given radius is about one millimeter, said thickness of said slice is about one-half millimeter, and said P-N junction has an active diameter of about twelve microns and a depth of about ten microns.

6. The injection laser defined in claim 2, wherein said slice comprises a layer of lightly doped relatively high resistivity semiconductor material of said one type conductivity in contact with a substrate of heavily doped relatively low resistivity semiconductor of said one type, said layer including said first surface, said substrate including said second surface, the intersection between said layer and said substrate lying in a plane parallel to said first and second surfaces and passing through said center of said sphere, and said region of the opposite type lying wholly between said first surface and said intersection.

7. The injection laser apparatus defined in claim 1, wherein the thickness of said slice is defined by first and second substantially parallel surfaces, wherein said reflector means comprises a stripe of substantially totally reflective material directly on said portion of said spherical surface of said slice with the length of said stripe lying in a plane normal to said first and second parallel surfaces, and wherein said injection laser apparatus further includes a lens in spaced relationship with a second portion of said spherical surface of said slice for refracting diverging light emerging from said second portion into parallel light, said second portion of said spherical surface of said slice being one-hundred-eighty degrees displaced with respect to said first-mentioned portion of said spherical surface of said slice.

8. The injection laser defined in claim 1, wherein the thickness of said slice is defined by first and second substantially parallel surfaces, wherein said reflector means comprises a stripe of substantially totally reflective material concentric with but spaced from said portion of said spherical surface of said slice with the length of said stripe lying in a plane normal to said first and second parallel surfaces, and wherein said injection laser apparatus further includes a lens in spaced relationship with a second portion of said spherical surface of said slice for refracting diverging light emerging from said second portion into parallel light, said second portion of said spherical surface of said slice being relatively one-hundred-eighty degrees displaced with respect to said first-mentioned portion of said spherical surface of said slice, and a galvanometer movement coupled to both said reflector means and said lens for altering the respective absolute angular positions of said first-mentioned and second portions on said spherical surface of said slice in accordance with a scanning control signal applied to said galvanometer means.

References Cited

UNITED STATES PATENTS

| 3,055,257 | 9/1962 | Boyd et al. | 331—94.5 |
| 3,241,085 | 3/1966 | Marcatili | 331—94.5 |
| 3,248,671 | 4/1966 | Dill et al. | 331—94.5 |
| 3,344,365 | 9/1967 | Lewis | 331—94.5 |
| 3,427,708 | 2/1969 | Schutze et al. | |

OTHER REFERENCES

Williams, H. B. and Shah, B. R., "Electronic Beam-Switching in Injection Lasers," from IBM Technical Disclosure Bulletin, vol. 7, No. 9, February 1965, p. 802.

RONALD L. WIBERT, Primary Examiner

T. MAJOR, Assistant Examiner